April 22, 1969

T. D. FENLEY 3,440,514

STATIC INVERTER

Filed May 3, 1966

Sheet ___/___ of 6

INVENTOR
THOMAS D. FENLEY

BY *Hurvitz & Rose*

ATTORNEYS

April 22, 1969     T. D. FENLEY     3,440,514
STATIC INVERTER

Filed May 2, 1966     Sheet 3 of 6

INVENTOR
THOMAS D. FENLEY
BY Hurvitz & Rose
ATTORNEYS

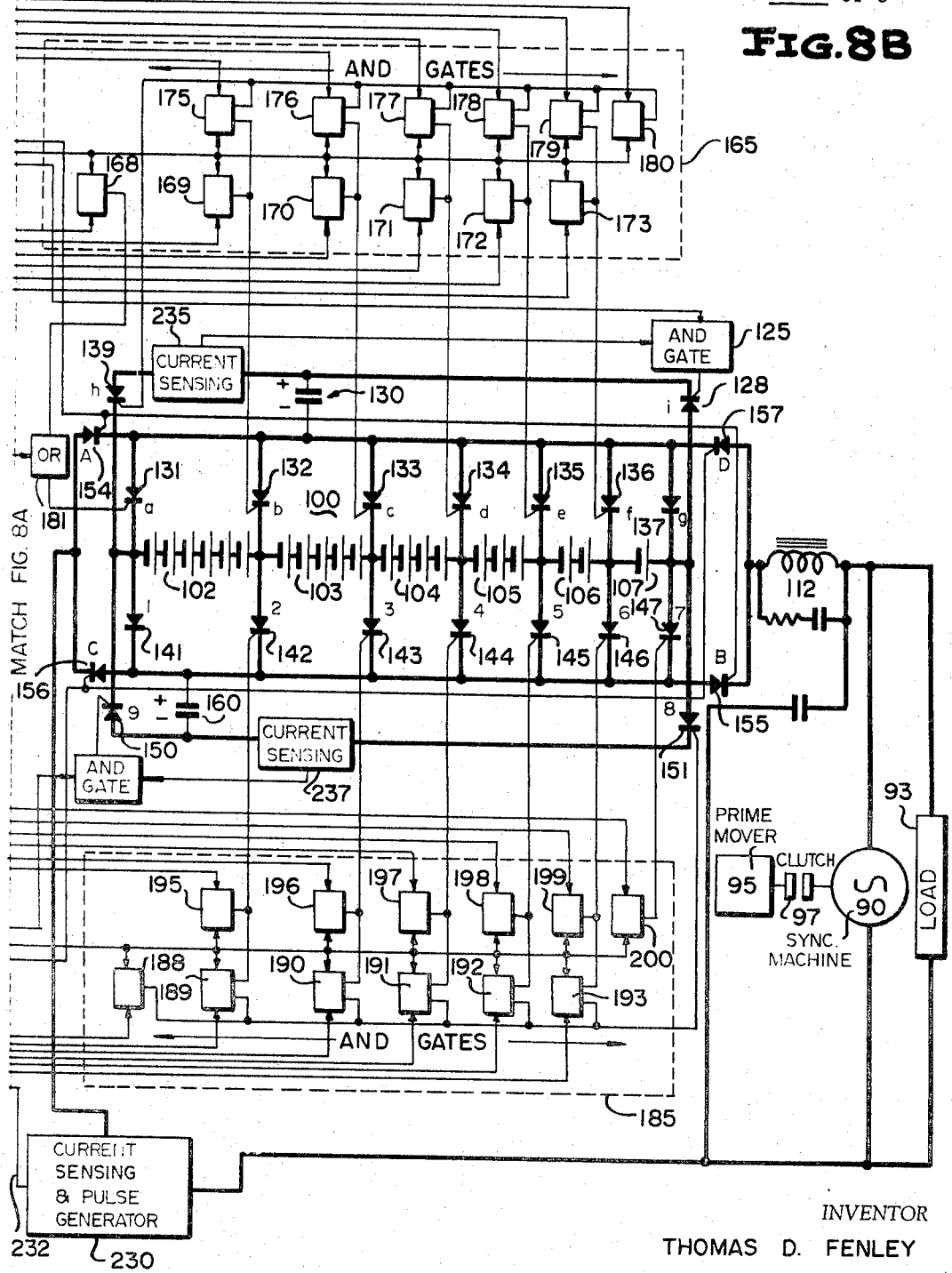

April 22, 1969

T. D. FENLEY 3,440,514

STATIC INVERTER

Filed May 3, 1966

INVENTOR
THOMAS D. FENLEY

BY *Hurvitz & Rose*

ATTORNEYS

# United States Patent Office 3,440,514
Patented Apr. 22, 1969

3,440,514
STATIC INVERTER
Thomas D. Fenley, Box 370A, R.D. 1,
Hightstown, N.J. 08520
Filed May 3, 1966, Ser. No. 547,328
Int. Cl. H02j 7/02, 7/10
U.S. Cl. 320—6                                 11 Claims

ABSTRACT OF THE DISCLOSURE

A static inverter for charging a group of series-connected batteries from an A.C. power source and for discharging the batteries to supply A.C. power to a load includes a plurality of switches coupling the batteries to the power source so that activation of each switch causes the charging of a distinct and different battery or group of batteries from that charged upon activation of any other switch, and a further plurality of switches coupling the batteries to the load so that activation of each of the latter switches causes power to be supplied to the load from a distinct and different battery or group of batteries from that supplying power upon activation of any other switch of the latter switches. The charge and discharge mode switches are respectively activated in sequence such that the batteries are effectively supplied with a D.C. charging current during operation in the charge mode, and provide an A.C. staircase output waveform during operation in the discharge mode. Logic circuitry is provided to effect charge and discharge mode selection according to conditions existing in the overall inverter system.

---

The present invention relates generally to static electrical conversion systems and, more particularly, to a solid state system which is operable to convert direct current to alternating current or, inversely, to produce direct current from an alternating current excitation.

In the past, it has been commonplace to employ rotating machinery for purposes of A.C. to D.C. conversion or D.C. to A.C. inversion. For example, a prior art dynamic A.C. to D.C. converter typically comprised an A.C. motor and a D.C. generator, the former driving the latter; while a dynamic D.C. to A.C. inverter might utilize a D.C. motor to drive an A.C. generator. In other words, the dynamic systems required energy conversion by way of using electrical power to produce motive power and thence employing the motive power to generate electrical power of a different form from that of the original excitation. Since an A.C. motor can be operated as an A.C. generator and a D.C. generator as a D.C. motor by reversing input and output, i.e. applying torque to the motor shaft to produce an electrical output or vice versa, it is apparent that the same dynamic apparatus could be used to provide either A.C. to D.C. or D.C. to A.C. conversion, or both.

More recently, a variety of static inverters have been developed, so-called because no rotating machinery is employed, and in general using such devices as ignitrons (mercury vapor rectifiers) or SCR's (silicon controlled rectifiers). While devices falling within the broad class of static inverters are capable of converting either A.C. to D.C. or D.C. to A.C., unlike rotating machinery, they are generally not adapted to reversible use and, hence, are incapable of performing both tasks within the same apparatus. Nevertheless, the static inverter generally represents a significant advance over the older dynamic systems of electrical conversion, particularly in the low power area, providing advantages of economy, simplicity, and reliability.

It is a primary object of the present invention to provide improved static inversion systems, capable of converting A.C. to D.C. or D.C. to A.C. within the same apparatus.

It is another object of the present invention to provide reversible electrical conversion apparatus requiring neither rotating machinery nor thermionic elements.

A further object of the invention is to provide a solid state system for static inversion of A.C. to D.C. and D.C. to A.C.

Still another object of the present invention is to provide a static inverter adapted to convert the D.C. voltages from a plurality of series-connected batteries to an A.C. voltage having a staircase waveform and frequency suitable for energizing a load having prescribed A.C. voltage and frequency requirements, and to supply D.C. charging current to the batteries from an A.C. power source when the batteries are not supplying power to the load.

Briefly, a preferred embodiment of the present invention for selectively charging and discharging a plurality of series-connected batteries from and to an A.C. power source and A.C. load, respectively, includes a battery charging circuit comprising a first plurality of normally non-conductive unidirectional current switches, means coupling each of the switches to distinct and different groups of the series-connected batteries and to the power source, and means for selectively and sequentially rendering each of the switches conductive to apply charging current from the power source to the respective groups of batteries in the form of a staircase waveform, each step of the staircase supplying power to a different group of batteries; and a battery discharging circuit comprising a second plurality of normally non-conductive unidirectional current switches, means coupling each of the second plurality of switches to distinct and different groups of the series-connected batteries and to the load, and further means for selectively and sequentially rendering each of the second plurality of switches conductive to apply step voltages in a staircase waveform from the batteries to the load.

A feature of the invention resides in the provision of a simple and reliable circuit for correcting variations from unity power factor during charging or discharging of the batteries.

The above and still further objects, features and attendant advantages of the present invention will become apparent from a consideration of the following detailed description of a preferred embodiment thereof, especially when taken in conjunction with the accompanying drawings, in which.

Figure 5:
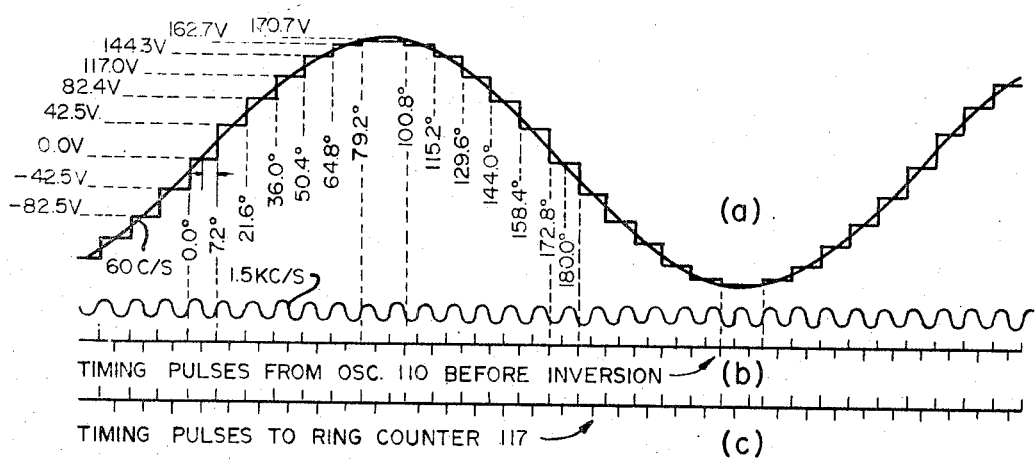
Figure 6:
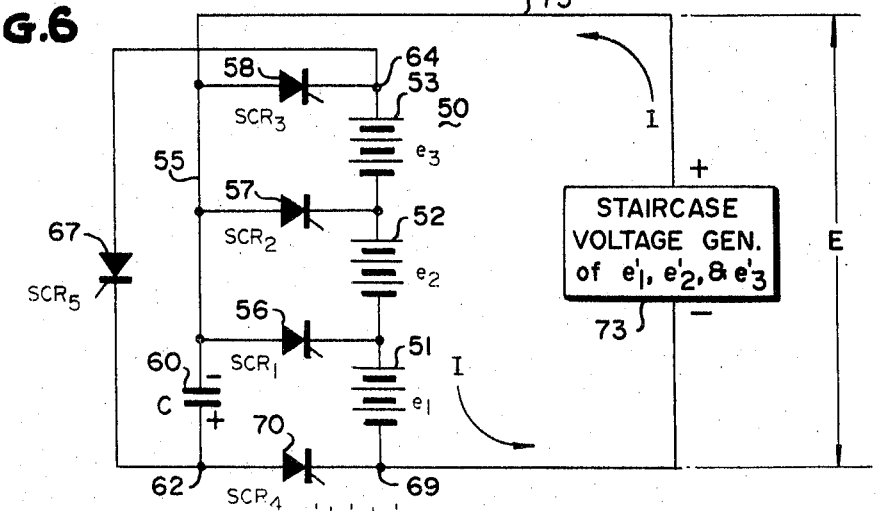
Figure 7:
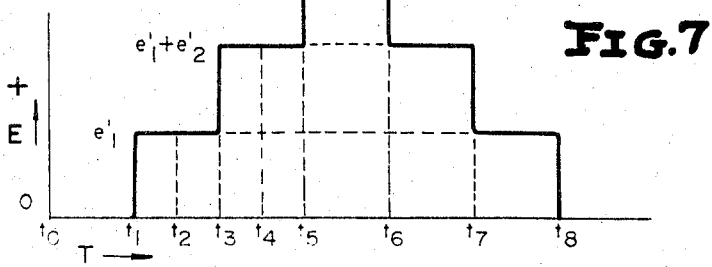
Figure 9:
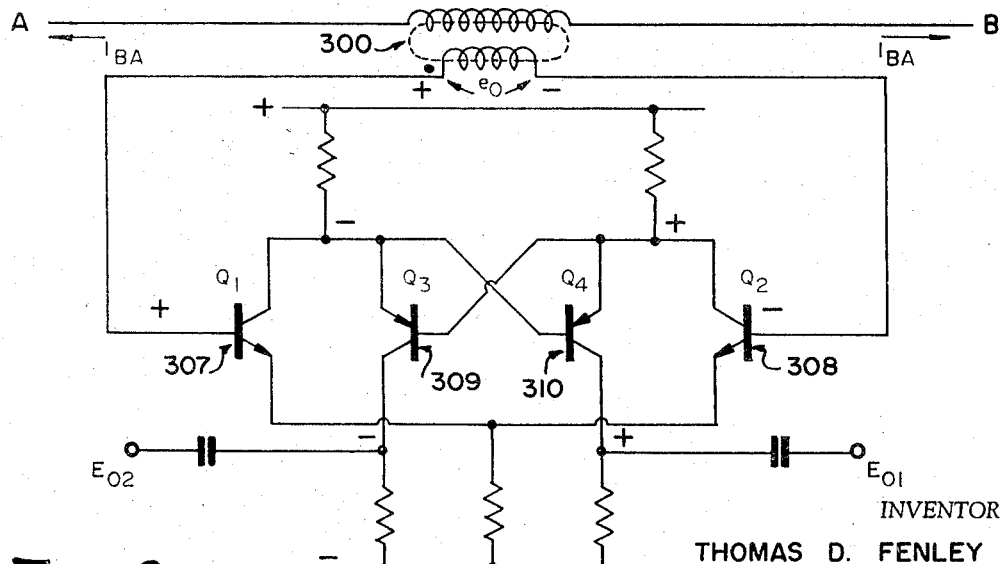
Figure 8A:
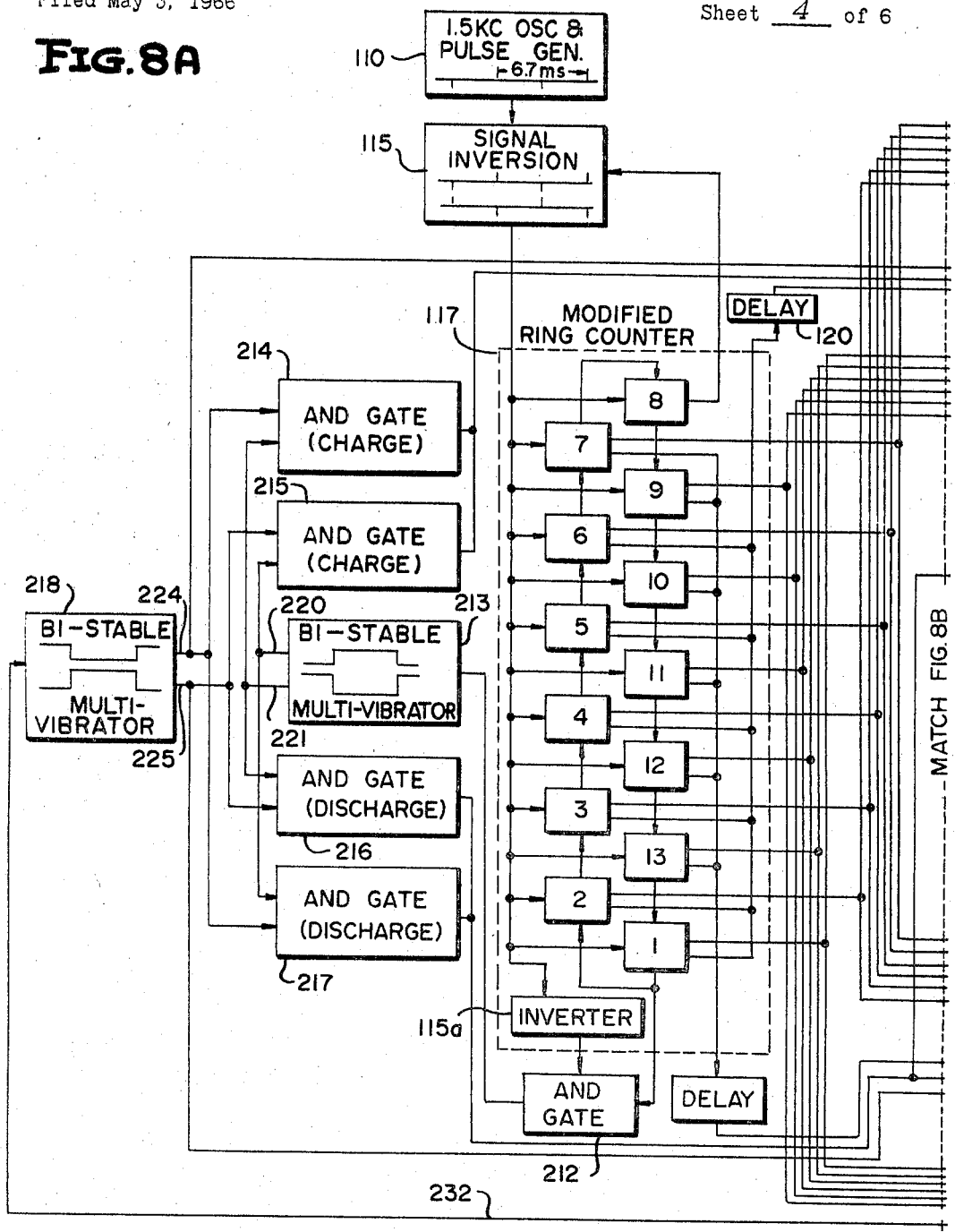
Figure 10:
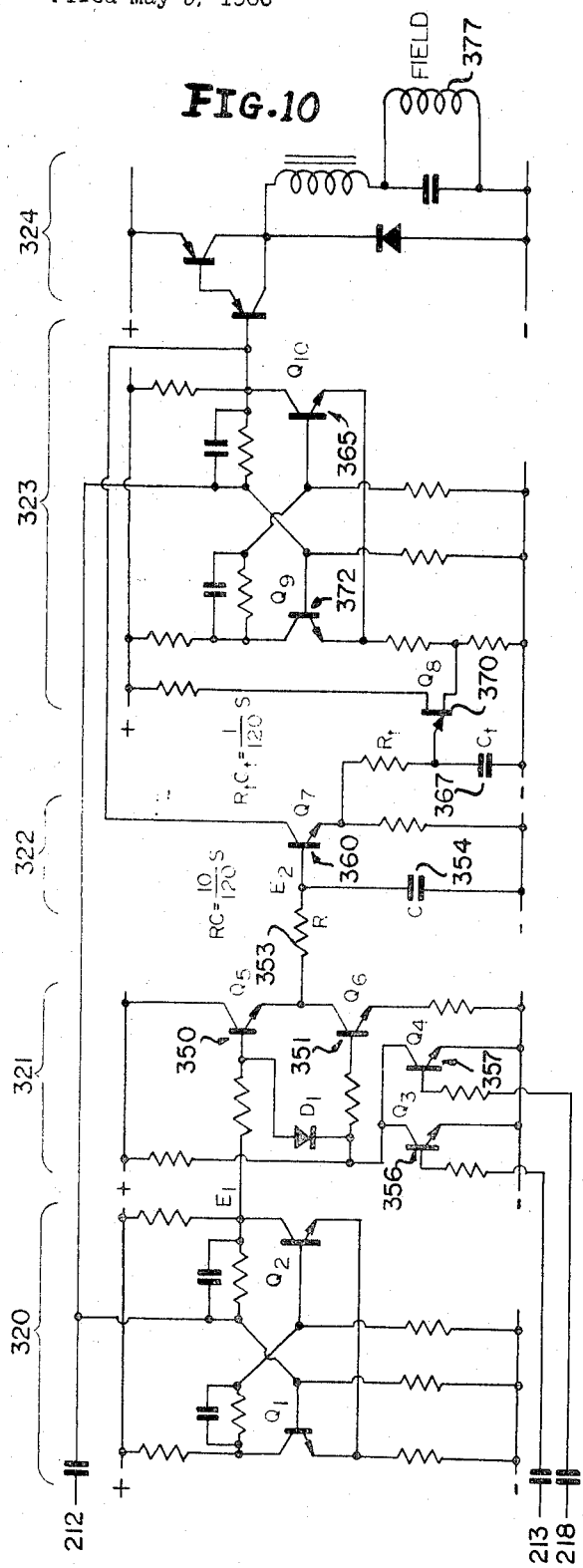

FIGURES 5(a), (b) and (c) illustrate the generation of a six-step staircase waveform;

FIGURES 6 and 7 are, respectively, a circuit for charging batteries from an A.C. power source and a graph of voltage versus time indicating the operation of the charging circuit;

FIGURE 8 is a diagram of an overall static inverter suitable for use in conjunction with batteries, A.C. power source and load;

FIGURE 9 is a circuit diagram of the current sensing and pulse generator circuit of FIGURE 8;

FIGURE 10 is a diagram of a suitable power factor regulating circuit for use with the circuit of FIGURE 8; and FIGURES 11(a) through (f) illustrate voltage-current relationships in the circuit of FIGURE 10.

Figure 1:
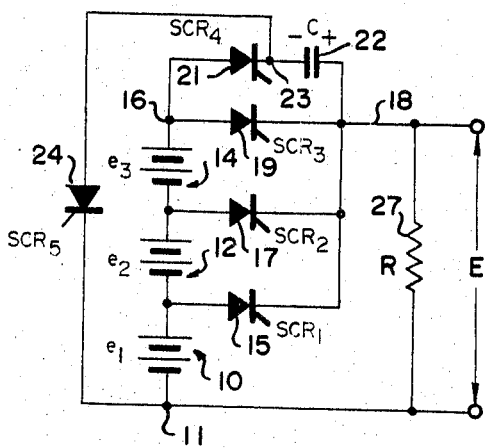
FIGURE 1 is a diagram of a circuit for generating a positive staircase waveform.

Referring now to FIGURE 1, a clearer understanding of the present invention may be had by considering the voltage step or staircase waveform generator there shown. The generator includes a plurality of D.C. power supplies, such as batteries 10, 12, and 14, which are series connected between terminals or junctions 11 and 16, each power supply having associated therewith a silicon controlled rectifier (SCR) 15, 17 and 19, respectively, connected from its positive terminal to a further node or terminal 18. SCR 21 and capacitor 22 are series connected between terminals 16 and 18, and between their junction 23 and terminal 11 is connected still another SCR, designated 24.

The output, E, of the generator is taken across a load impedance, shown as resistor 27, coupled between terminals 11 and 18. The control or gate electrodes of the SCR's may be connected to preselected terminals of an accurately timed commutating device (not shown) such as a sequential switch timer and power source, for "firing" the rectifiers (SCR's) in the desired order.

Figure 2:
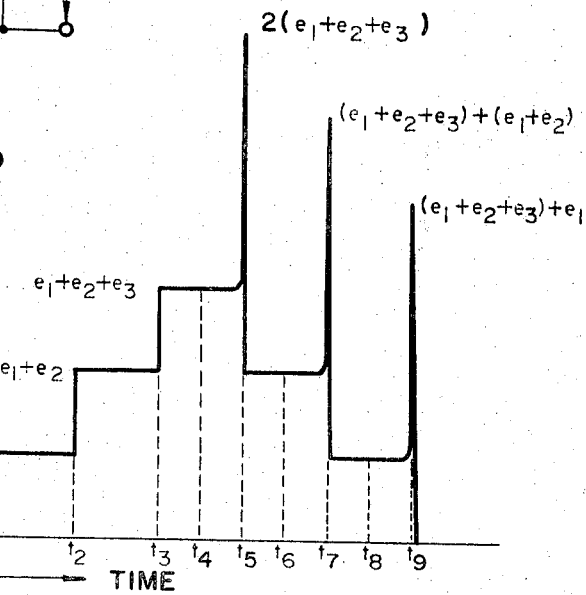
FIGURE 2 is a graph of voltage versus time indicating the operation of the circuit of FIGURE 1.

Operation of the circuit of FIGURE 1 may be better understood by reference to the output voltage (E) versus time (T) curve of FIGURE 2. With none of the SCR's conducting the output voltage E is 0, this situation being depicted as occurring at an arbitrary reference time $t_0$. At some later time $t_1$, SCR 15 is triggered, thereby connecting supply 10 across load 27 so that voltage E is ideally (assuming zero supply resistance) equal to the source voltage $e_1$. At time $t_2$, SCR 17 is triggered and E rises rapidly to a value of $e_1+e_2$, SCR 15 substantially simultaneously returning to its blocking state since a silicon controlled rectifier cannot conduct current in the reverse direction. At time $t_3$, SCR 19 is rendered conductive and E attains a value of $e_1+e_2+e_3$, i.e. the sum of the voltage outputs of batteries 10, 12 and 14.

If SCR 24 is subsequently triggered, at time $t_4$, the additive voltage of sources 10, 12 and 14 will appear across both load 27 (as voltage E) and across capacitor 22 in parallel therewith. Thus, the capacitor is charged to this sum voltage $(e_1+e_2+e_3)$ with the polarity indicated in FIGURE 1. As soon as capacitor 22 is fully charged, the current through the path containing SCR 24 ceases and the latter SCR returns to its blocking state in the well known thyratron-like manner.

At time $t_5$, SCR's 17 and 21 are simultaneously triggered, resulting in a momentary increase of output voltage E to a value $2(e_1+e_2+e_3)$ because the batteries and capacitor 22 are thereby placed in series-aiding relationship across impedance 27. Almost instantaneously, consequently, the voltage across rectifier 19 is reversed in polarity by a value of $e_1+e_2+e_3$ volts, and that SCR will revert to its blocking state after only a few microseconds existence of this condition. If the triggering of SCR 17 is maintained beyond the time required for capacitor 22 to discharge, SCR 21 will return to its blocking state and SCR 17 will conduct, and output voltage E will fall to a value of $e_1+e_2$ volts. SCR 24 is again rendered conductive (at time $t_6$) to allow capacitor 22 to charge to $e_1+e_2$, after which the latter rectifier reverts to the blocking state. At time $t_7$, SCR's 15 and 21 are simultaneously triggered to produce a momentary increase in E to a value $(e_1+e_2+e_3)+(e_1+e_2)$, after which SCR 17, and then SCR 21, return to the blocking state and SCR 15 continues to conduct, dropping E to the value $e_1$ (assuming the triggering pulse for SCR 15 has a duration exceeding the discharge time for capacitor 22).

Similar operations at times $t_8$ (SCR 24 triggered) and $t_9$ (SCR 21 triggered) may readily be shown to result in the momentary increase of E returning SCR 15 to the blocking state and thence a decrease to the value 0. It will be observed that any staircase waveform may be synthesized in the aforementioned manner by appropriate selection of the number of steps, proper value of voltage per step, and proper time interval between steps.

Figure 3:
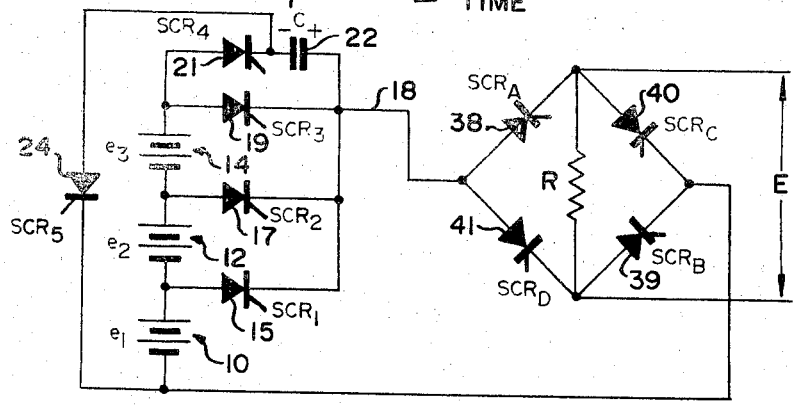
FIGURE 3 is a diagram of a circuit for generating an A.C. staircase waveform.
Figure 4:
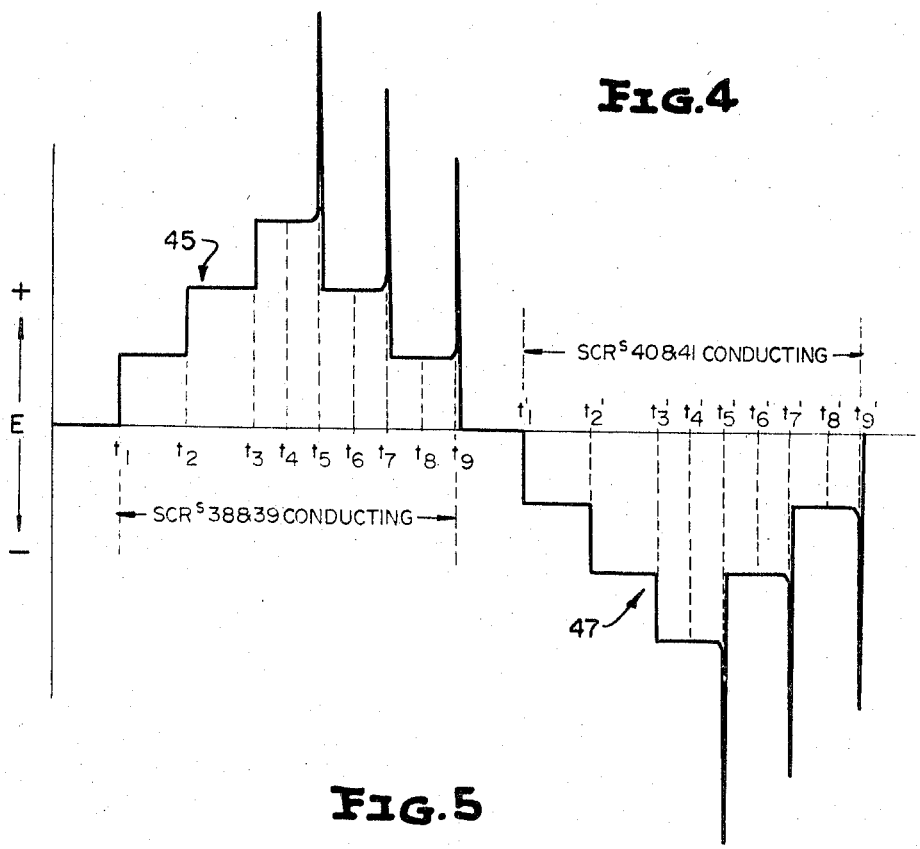
FIGURE 4 is a graph of voltage versus time for the operation of the circuit of FIGURE 3.

A reversal of polarity of the staircase waveform, i.e. repetition of the waveform of FIGURE 2 with opposite direction of current flow through the load, may be achieved by use of the circuit of FIGURE 3. The circuits of FIGURES 1 and 3 differ only in that an SCR bridge is substituted for load 27 with output voltage E taken across bridge diagonal impedance 35. It will be apparent to those skilled in the art from a consideration of the description relating to FIGURES 1 and 2 that, when SCR's 38 and 39 are conducting and the aforementioned timing and triggering sequence is followed, a positive voltage staircase (designated by reference numeral 45 in FIGURE 4) is obtained at the output, while in the case of conduction by SCR's 40 and 41 (SCR's 38 and 39 blocked) the timing and triggering sequence will result in passage of currents in an opposite direction through load impedance 35 and hence, a reversal in the polarity of the staircase waveform (as designated by reference numeral 47 in FIGURE 4).

If the triggering of SCR's 38 and 39 and the triggering of SCR's 40 and 41, respectively, is alternated as the aforementioned timing sequence is repeated, it will be observed that an alternating current will then flow through the load impedance 35 with each half cycle corresponding to a time interval of $t_0$ to $t_9$ seconds. The period of each cycle of the synthesized A.C. waveform is obviously $2(t_9-t_0)$ seconds, so that the fundamental frequency is $$\frac{1}{2(t_9-t_0)}$$

cycles per second. Harmonics are present in the output waveform, that of greatest amplitude determined by the time interval between trigger pulses and having a frequency $$\frac{1}{t_n-t_{n-1}}$$

c.p.s. if this time interval is identical for successive trigger pulses. The harmonics can, of course, be filtered from the output wave form in a conventional manner, and the source voltages $e_1$, $e_2$, $e_3$, etc. chosen to produce a clean, harmonic-free, sinusoidally varying output voltage having a frequency of $$\frac{1}{2(t_9-t_0)}$$

c.p.s. It will be apparent from the preceding description that the number of voltage steps and the timing and triggering sequence may be selected to provide any desired frequency, amplitude, and slope in the output waveform.

In FIGURE 5(a), to which further reference will subsequently be made, there is illustrated a six-step staircase waveform, for example, along with trigger pulse requirements (FIGURES 5(b) and (c)) to produce a 60 cycle per second sine wave with $E_{max}$ (peak voltage) of 170 volts ($E_{RMS}$ of 120 volts).

Referring now to FIGURE 6, an exemplary embodiment of a battery charging circuit is shown which may be used to charge the batteries used in the circuit of FIGURE 1. The battery to be charged is generally designated by reference numeral 50 and has stages 51, 52 and 53 which have voltages of magnitude $e_1$, $e_2$ and $e_3$, respectively. Between the positive terminal of each of stages 51, 52 and 53 of battery 50 and the conductive path 55, there is connected a silicon controlled rectifier, 56, 57, 58, respectively, poled to conduct current from path 55 to the path containing the battery. A capacitor 60 is connected from the anode of SCR 56 in path 55 to a terminal 62, and from the junction 64 of the cathode of SCR 58 and the positive terminal of battery stage 53 to junction 62, there is connected another SCR 67. SCR 70 is connected between junction 62 and the negative terminal of battery stage 51.

A staircase voltage generator 73 has its positive output terminal connected via a conductive path 75 to path 55 and its negative output terminal connected to junction 69. In order to charge battery stages 51, 52 and 53, it is required that staircase generator 73 have voltage steps of $e_1'$, $e_2'$, and $e_3'$, where $e_1'$ is greater than $e_1$, $e_2'$ is greater than $e_2$, and $e_3'$ is greater than $e_3$, but $e_1'$ is less than $(e_1+e_2)$ and $(e_1'+e_2')$ is less than $(e_1+e_2+e_3)$. The nature of such a staircase voltage generator will be described presently.

Referring concurrently to the voltage (E) versus time (T) graph of FIGURE 7, where E is the output voltage of the staircase generator 73 at time T, the staircase generator voltage E rises to $e_1'$ volts and SCR 56 is triggered to the conductive state at time $t_1$. Since $e_1'$ is greater than $e_1$, current will flow from the positive output terminal of staircase generator 73 via paths 75 and 55 through SCR 56, battery stage 51, and back to the negative terminal of the staircase generator, thereby charging the latter battery stage. At time $t_2$, SCR 67 is triggered, thus completing a conductive path from junction 64 to junction 62, through capacitor 60, SCR 56, battery stages 52 and 53 and battery junction 64, so that capacitor 60 charges to $(e_2+e_3)$ volts with the polarity as indicated in the figure. When the capacitor is fully charged, the current flow through SCR 67 ceases and the latter will return to its blocking state.

At time $t_3$, staircase generator output voltage rises to $(e_1'+e_2')$ volts and SCR's 57 and 70 are simultaneously triggered via their respective gate electrodes. Under these conditions, the voltage across SCR 56 momentarily reverses to the sum of the voltage of battery stage 51 and the voltage to which capacitor 60 is charged, since these two voltages are in a series-aiding relationship, and current flow through SCR 56 thereby ceases, after a time interval of a few microseconds (approximately 15), with return to the blocking state. When capacitor 60 completely discharges, SCR 70 reverts to its blocking state, but SCR 57 will continue to conduct if the trigger pulse has a longer duration than the time required for the capacitor to discharge. Since $(e_1'+e_2')$ is greater than $(e_1+e_2)$, current flow is in the direction of the arrow, as indicated in FIGURE 6, through conductive paths 75 and 55, SCR 57, battery stages 52 and 51, and back to the negative terminal of staircase generator 73, charging both stages 51 and 52 of the battery.

At time $t_4$, SCR 67 is again triggered to permit capacitor 60 to charge to a voltage value of $e_3$ with polarity as indicated, by virtue of the completed circuit path via SCR 57, battery stage 53, junction 64, SCR 67 and junction 62. SCR 67 will again revert to its blocking state when capacitor 60 has fully charged. At time $t_5$, the output voltage E of staircase generator 73 rises to $(e_1'+e_2'+e_3')$, and SCR's 58 and 70 are simultaneously triggered by appropriate trigger pulses applied to their respective gate electrodes. As previously occurred with SCR 56, SCR 57 will be momentarily subjected to a reverse voltage of value $(e_1+e_2+e_3)$ whereupon current flow through SCR 57 will cease after an interval of approximately 15 microseconds and that rectifier will return to its blocking state. Again, if the trigger pulse applied to the gate electrode of SCR 58 has a longer duration than the time interval required for discharge of capacitor 60, SCR 58 will conduct when the capacitor has fully discharged. Since $(e_1'+e_2'+e_3')>(e_1+e_2+e_3)$ current will flow in the direction of the arrow from the positive output terminal of the staircase generator via conductive path 75, SCR 58, through battery stages 53, 52 and 51 and back to the negative output terminal of the staircase generator, so that all three stages of battery 50 are charged.

At time $t_6$, when the generator voltage E drops to a value of $(e_1'+e_2')$ SCR 57 is triggered and will conduct current in the direction of the arrow because $(e_1'+e_2')$ is greater than $(e_1+e_2)$, while simultaneously therewith the voltage across SCR 58 is reversed and the latter rectifier returns to its blocking state. It will be observed that the current flow is again in a direction which will charge battery stages 52 and 51. At time $t_7$, when the generator voltage falls to $e_1'$ and current flow ceases through SCR 57, SCR 56 is triggered and current flows therethrough by virtue of the relative magnitudes of $e_1'$ and $e_1$. Battery stage 51 is therefore charged during the time interval $t_7$ to $t_8$, at the conclusion of which the generator voltage drops to zero volts and SCR 56 ceases to conduct, returning to its blocking state.

The circuits of FIGURES 3 and 6 may be combined, along with filter networks, and sensing and logic circuitry for controlling the trigger pulses, to produce a solid state static inverter having the features of rotating machinery in converting A.C. to D.C. and D.C. to A.C., but without the disadvantages thereof. An exemplary embodiment of such a solid state static inverter, according to the present invention, is shown in FIGURE 8.

Referring now to FIGURE 8, a synchronous machine 90 is placed in parallel with load 93. Synchronous machine 90 is coupled to a prime mover 95 via a clutch 97 which may be selectively engaged or disengaged. When engaged, the prime mover supplies power to load 93 as well as to a storage battery 100 having six stages 102 through 107, inclusive; and when the clutch is disengaged, the storage battery 100 supplies all the power to the load. For the sake of example, the static inverter will be described in terms of receiving power from the synchronous machine at 120 volts RMS and 60 cycles per second. Also for purposes of example, six stages of storage battery 100 are employed to illustrate the manner in which a staircase waveform of six steps as shown in FIGURE 5(a) may be generated, with the voltage in each step selected to produce a 60-cycle per second sinusoidal fundamental frequency.

A 1.5 kilocycle (kc.) oscillator and pulse generator 110 is utilized to time the trigger pulses so as to provide the fundamental 60 c.p.s. frequency, with six steps to each quarter cycle of the sinusoid. Parallel resonant circuit 112 is placed in series with synchronous machine 90 and load 93 for purposes of filtering the 1.5 kc. staircase harmonic from the power supplied to the load. When clutch 97 is engaged and prime mover 95 is supplying power to load 93 as well as to storage battery 100, the 1.5 kc. resonant circuit 112 in series with the 60 c.p.s. generator provides a summation voltage that closely approximates the staircase voltage generator 73 of FIGURE 6 required for charging the battery. When clutch 97 is disengaged, synchronous machine 90 continues to run synchronously to further reduce harmonics from the static inverter that may be present in the 60 c.p.s. fundamental, and all power is supplied to the load from battery 100.

A better understanding of the circuit requirements and of the operation of the static inverter will be had by concurrent reference to FIGURES 5(a), (b) and (c). It will be noted from those figures that one cycle of 1.5 kc. frequency is required to time each step of the staircase waveform except at the positive and negative peak where one and one-half cycles is required for timing. This prevents a 180-degree phase shift in the 1.5 kc. voltage impressed across L-C filter 112 which would otherwise accompany a reversal in direction of the staircase voltage waveform following the peak voltage step.

Returning now to a description of the circuit of FIGURE 8, a 1.5 kc. oscillator and pulse generator 110 is, as previously stated, utilized to time the staircase voltage and may be of conventional design. The pulse generator is preferably of high stability since it determines the accuracy of frequency stability of the entire apparatus irrespective of whether or not the prime mover 95 is charging battery 100. The output of pulse generator 110 is applied to a signal inversion circuit 115 which may include a single stage unity gain amplifier selectively switched in or out of the inversion circuit according to the state of a bistable multivibrator (flip-flop, not shown) also included in inversion circuit 115. The multivibrator is alternately switched from one stable state to the other by successive positive pulses emanating from stage 8 of a substantially conventional ring counter 117. The purpose of stage 8 and the switching is to permit the passage of two positive pulses in succession (one-half cycle apart) by signal inversion circuit 115 (see FIGURE 5c), which will provide the extra half timing period for the peak voltage step as previously discussed.

Ring counter circuit 117 is comprised of thirteen stages which complete and close the ring, each stage being identical to the other stages, except that stage 1 is arranged to be energized to the "on" condition when power is first turned on while the other stages remain in the "off" condition and stage 8 has only one output while the remaining stages each have a pair of outputs. All stages of the ring counter circuit are connected to receive pulses simultaneously from signal inversion circuit 115. The pulses alternate in polarity at the prescribed frequency except at those times when the staircase waveform reaches peak voltage, either positive or negative, in which case two positive pulses are supplied in succession one-half cycle apart by signal inverter 115. Each stage of the ring counter is responsive only to positive pulses from the signal inversion circuit to assume the "off" condition; that is, each stage will remain in the "on" condition until it receives a positive pulse from the signal inverter at which time it will revert to the "off" condition. Of course, the ring counter is arranged so that only one stage is "on" at a time; when that stage is turned off; upon receipt of a positive pulse from the signal inverter 115, it provides a trigger pulse to the next successive stage to turn that stage on. When any stage of the counter is turned on, it transmits at each of its two outputs a positive pulse, and as will be observed from the figure, one of the positive output pulses of each of stages 1–6 inclusive is supplied to a delay circuit 120 and thence to an AND gate 125 whose output is used to trigger SCR 128 to charge capacitor 130 in the battery charge circuit. The delay is necessary in both the charge circuit and the discharge circuit to insure that the capacitor has completely discharged before attempting to charge it again.

It will be observed that the battery charge circuit corresponds to the circuit of FIGURE 6 and includes SCR's 128, 132–137 and 139 having functions corresponding respectively to SCR's 67, 56–58 and 70, and capacitor 130 corresponding in function to capacitor 60 of FIGURE 6.

The battery discharge circuit or staircase voltage generator includes SCR's 142–147, which function in the same manner as SCR's 15, 17 and 19 of FIGURE 3, SCR's 150 and 151 which function in the same manner as SCR's 24 and 21, respectively of FIGURE 3, main rectifying SCR's 154–157 which are operative to provide the polarity reversal through the load in the manner of SCR's 38–41 of FIGURE 3, and capacitor 160 which functions similarly to capacitor 22 of FIGURE 3.

SCR's 131 and 141 are required to isolate the charge and discharge circuits from each other and have no counterparts in FIGURES 6 or 3.

One output of each of stages 7 and 9–13 of ring counter 117 is employed to trigger SCR 150 in the battery discharge circuit. The other output pulse of all ring counter stages except stage 8 is a sustained positive pulse which is on as long as the stage is on and is utilized to trigger the battery charge SCR's 131–137 and 139 or the battery discharge SCR's 141–147 and 151. It will be observed that, although SCR's are specified for elements 141 and 137, these elements may be conventional diodes, as shown, if desired.

The trigger pulses for the SCR's in the battery charge circuit are supplied by a plurality of AND gates in charge mode circuit 165, and to this end, the ring counter stages supply at least one pulse input to each of the charge mode AND gates. Output pulses from the ring counter stages are also supplied to AND gates in the discharge mode circuit 185 for the purpose of governing the triggering of the SCR's in the battery discharge circuit. For example, one output pulse from each of stages 9–13 and 1 of the ring counter is supplied to AND gates 168 through 173, respectively, in charge mode circuit 165 and simultaneously to AND gates 188 through 193, respectively, of the discharge mode circuit 185. Similarly, an output pulse from each of stages 2–7 of the ring counter circuit is supplied respectively to charge mode AND gate circuits 175–180 and to the discharge mode AND gates 195–200. It will, of course, be understood that no output pulse is generated by any of the AND gates in either of the charge mode or discharge mode circuits absent a corresponding pulse applied to the second input of the respective AND gate. The manner in which this second input is obtained will be explained presently. It will be noted, however, from the preceding discussion that ring counter 117 determines the timing and triggering sequence, and hence the instantaneous voltage output with respect to time, but it is the operation of the AND gates in the charge or the discharge mode circuits which determine whether or not a charge or a discharge SCR is to be triggered and hence a charge or discharge current is to flow. All of the AND gates in both the charge and discharge mode circuits are identical except that gates 168–173 and 195–200 have a single output while the remaining gates have dual outputs. The first output of the latter gates is of extremely short duration regardless of sustained input pulses and is employed to trigger the capacitor discharge circuit in order to extinguish the preceding SCR as previously described while the next succeeding SCR is rendered conductive by the second output which is slightly longer in duration than the time required for the preceding SCR to be extinguished. This will become further apparent in the ensuing description of operation of the circuit.

The second input to the AND gates in charge mode circuit 165 is supplied from the output of a pair of charge AND gates 214 and 215 while the second input for the AND gates in the discharge mode circuit 185 is supplied from the output of discharge AND gates 216 and 217. Consideration of FIGURES 5(a) and (b) will indicate that the 60 c.p.s. sine wave passes through zero volts and changes polarity at zero degrees, 180 degrees, 360 degrees, etc. and is always midway between 1.5 kc. steps on the staircase waveform. AND gate 212 functions to time this midpoint by generating an output pulse when it simultaneously receives a positive pulse from ring counter stage 1 and a positive pulse from signal inversion circuit 115a. The latter pulse is derived from a negative pulse generated by circuit 115 so that AND gate 212 may supply the required positive output pulse half way between the successive pulses that turn on stages 1 and 2. The output of gate 212 is applied to bistable multivibrator 213 to trigger the circuit to one or the other of its stable states. Hence, bistable multivibrator (flip-flop) 213 has one of its two outputs "on" at all times. That is, at any given instant of time a positive voltage will appear at either lead 220 or at lead 221, e.g. if a positive output pulse of flip-flop 213 is applied in parallel to charge mode AND gate 215 and to discharge mode AND gate 217 a negative output pulse on lead 221 is applied in parallel to AND gates 214 (charge) and 216 (discharge). All of AND gates 214, 215, 216 and 217 are identical and conventionally require two corresponding inputs, e.g. both "on" to provide an "on" output. The other input to these gates is supplied by a second flip-flop 218, which is operative, when triggered to one stable state, to provide a positive output on lead 224 and, when triggered to the other stable state, to provide a positive output on lead 225 in a manner similar to 213. The positive output pulse from flip-flop 218 appearing on output lead 225 is applied in parallel to AND gate 215 (charge) and to AND gate 216 (discharge) while the positive output pulse appearing at lead 224 is applied in parallel to AND gate 214 (charge) and AND gate 217 (discharge).

Since one output of bistable multivibrator 218 must be "on" at all times, in the same manner as the outputs of flip-flop 213, it follows that one and only one of AND gates 214 through 217 can have an output at any given instant of time and that at least one of those gates must have an output at all times. For example, simultaneous occurrence of a positive output on lead 220 of flip-flop 213 and a positive output on lead 225 of flip-flop 218 can result in the coincident application of corresponding inputs to only AND gate 215, both inputs being positive in this case. Hence, only AND gate 215 will provide an output pulse at that particular instant of time. Similarly, a positive output pulse on lead 220 from bistable multivibrator 213 and a positive pulse on lead 224 from bistable multivibrator 218 will result in the coincident application of input pulses to both input terminals of AND gate 217 only, resulting in the output of a pulse therefrom. It will further be noted that, if either one of flip-flops 213 or 218 changes state, then that AND gate 214–217 which is "on" must revert to the "off" condition, and a different one of the AND gates must turn "on." If, under these conditions, a charge gate is turned off then the gate which is turned on must be a discharge gate or vice versa. However, if both flip-flops 213 and 218 change state simultaneously, then the AND gate 214–217 which is "on" must revert to the "off" condition but, in this case, from one charge gate to the other charge gate or from one discharge gate to the other discharge gate. Slight consideration of the connections from the two bistable multivibrators to the four AND gates will indicate that these are the only possible switches that may occur in the AND gates for the recited changes of state of the two flip-flops.

It will also be observed that flip-flop 218 supplies trigger pulses to control the main rectifying silicon controlled rectifiers 154, 155, 156 and 157. A pulse on output lead 224 of the flip-flop will trigger SCR's 154 and 155 to the conductive state whereas a pulse on output lead 225 will trigger SCR's 156 and 157 to the conductive state. As previously stated, flip-flop 218 must have one of its outputs "on" at all times; it therefore follows that either SCR's 154 and 155 or SCR's 156 and 157, respectively, must be "on" at all times. The circuit remains in a stable condition in either state as long as current flows in that pair of the main rectifying SCR's which have been triggered by multivibrator 218. When current ceases to flow in that pair of SCR's, the absence of current is sensed by a current sensing circuit and pulse generator 230, in series with load 93 and the battery circuit. Simultaneously therewith, circuit 230, to be described in detail presently, generates an output pulse on conductive lead 232 to switch flip-flop 218 to the other of its stable states. When this occurs, the other pair of main rectifying SCR's is turned on. For example, if current flow ceases through SCR's 154 and 155, each of that pair of rectifiers will revert to its blocking state and circuit 230 will generate an output pulse switching the "on" output of flip-flop 218 from SCR's 154 and 155 to SCR's 156 and 157. Circuit 218 remains in this stable state until current flows through the latter pair of SCR's and ultimately ceases, at which time current sensing circuit 230 generates another pulse to switch the "on" output of the flip-flop back to SCR's 154 and 155. During this sequence of events, flip-flop 213 is switched by the output of gate 212 every 1/120 of a second, or twice each cycle of 60-cycle per second voltage and entirely independent of any switching taking place in 218, so that a change in output pulse is always required from one of AND gates 214 through 217 to another of the AND gates 214–217 at least every 1/120 second. In this manner, one and only one of the AND gates in either of the charge or discharge mode circuits 165 and 185, respectively, has coincident pulses applied to both its inputs to result in an output pulse therefrom and this condition will switch from charge mode to discharge mode or vice versa whenever 213 is switched unless accompanied by a simultaneous switch of 218.

Assume that, in a given interval of time, stage 3 of ring counter 117 is "on." This results in the application of a positive pulse to AND gate 196 in the discharge mode circuit 185 and to AND gate 176 in the charge mode circuit 165. Assume further that the latter receives a coincident input pulse from one of the two charge AND gates 214 or 215. Hence, SCR's 133 and 139 are triggered "on," the latter causing capacitor 130 to discharge from its previously charged state. As previously explained in connection with FIGURE 6, the triggering of the capacitor discharge SCR 139 extinguishes the preceding SCR to a battery stage, SCR 132 in this instance, while the next succeeding SCR is turned on. Such capacitor discharge is required fo reach step upwardly in the staircase when charging and also for each step downwardly in the staircase when discharging. From the sequence set by the ring counter, it will be observed that any possible capacitor discharge pulse is always preceded by a capacitor charge pulse from the preceding "on" stage of the ring counter to insure that the capacitor is fully charged. In the case of the battery charge circuit, the capacitor charge pulse from the preceding ring counter stage proceeds first through delay circuit 120 and then through AND gate 125 before capacitor charge SCR 128 is triggered. It will be observed that delay circuit 120 and current sensing circuit 235 are employed to insure that the capacitor 130 is entirely discharged prior to the triggering of SCR 128. When clutch 97 is engaged, prime mover 95 supplies power to both load 93 and to storage battery. As previously mentioned, the series arrangement of 60 c.p.s. generator (synchronous machine) 90 and 1.5 kc. parallel resonant circuit 112 produces a summation voltage closely approximating the staircase voltage generation required for charging. Hence, charging current is supplied to battery 100 via one of the pairs of main rectifying SCR's for one direction of flow (one-half cycle of charging current) and via the other pair of main rectifying SCR's for the other direction of current flow. The proper pair of rectifying SCR's is triggered to the conductive state by the "on" output of flip-flop 218, which in turn is determined by the operation of current sensing circuit 230. Assume further that charging current is flowing to storage battery 100 via circuit path completed by the triggering of SCR's 156 and 157. This implies that the outputs of flip-flops 218 and 213 associated with leads 225 and 220 respectively are "on," circuits 230 and 212 having supplied the trigger voltages to switch the flip-flops to this state in accordance with an operation to be described in detail presently and that charge AND gate 215 supplies the coincident pulse. An "on" output at lead 225 can produce an "on" output from only AND gate 215 (charge) or AND gate 216 (discharge), depending upon the state of flip-flop 213. But in this instance a charging current was assumed so that the state of flip-flop 213 must be such that the "on" output is at lead 220. Charging current is completed therefore through SCR 133 and diode 141. From FIGURE 5(a) the instantaneous voltage is approximately eighty-two volts by the series connected battery stages 102 and 103. At the synchronous machine, the instantaneous voltage is about eighty-two volts and increasing sinusoidally. The difference between the voltage of the static inverter battery stages 102 and 103 and the synchronous machine voltage while stage 3 of the ring counter is "on" is the instantaneous voltage across the 1.5 kc. filter 112. At the conclusion of the "on" period for stage 3, the ring counter steps to stage four. This stepping continues and, as shown in FIGURE 5(a), the stepping sequence continues at a 5 kc. rate until maximum voltage is reached, at which time one and one-half steps are required to reverse and step back down to zero. At zero voltage, the bistable multivibrator 213 changes state and, absent a current reversal in the current sensing circuit 230, the static inverter would change to the discharge mode. However, if unity power factor is assumed, a change of state occurs for both 213 and 218 coincident with zero voltage. The inverter continues to operate in the charge mode by switching from charge AND gate 215 to charge AND gate 214 along with the switching of the main rectifying pairs of SCR's from 156 and 157 to 154 and 155. This switching back and forth continues every 1/120 of a second so long as the inverter continues to operate in the charge mode at unity power factor. The ring counter 117 and bistable multivibrator 213 insure that the charging SCR's 131–137 continue to be fired at the proper time and sequence to maintain the voltage output of the inverter phase-locked to the synchronous machine as though it were itself a synchronous machine. The amount of charging current to battery 100 from synchronous machine 90 is determined by the amount of torque applied to the synchronous machine by prime mover 95. Should this torque reverse and take motive power from the synchronous machine, the latter ceases operation as a generator and instantaneously begins operating as a motor, taking its power from the storage battery 100. At the moment of inversion, the current as sensed by current sensing circuit 230 would also invert and, if unity power factor is assumed, the current will be 180° out of phase with the voltage as under the charge mode. The bistable multivibrator 218, and switching of the main rectifying pairs of SCR's 154, 155 and 156, 157 will also shift phase with the voltage by 180° and the static inverter will operate in the discharge mode with switching back and forth between discharge AND gates 216 and 217. It should be noted here that OR gate 181, which turns on SCR 131 whenever it receives a pulse from AND gate 168 during charge mode operation, maintains SCR 131 on continuously during discharge mode operation. The action of SCR 131 during the discharge mode is therefore that of a diode, corresponding to the action of SCR 141 during the charge mode operation. Concurrently, the ring counter 117 maintains the proper firing time and sequence of discharge SCR's 141–147 through the discharge AND gates 185. In this manner, the transfer of power back and forth between synchronous machine 90 and the static inverter is the same as between any two synchronous machines.

The relationship between the 1.5 kc. frequency at which the pulse generator 110 is operating (and hence at which the ring counter and logic circuitry is operating) and the 60 c.p.s. frequency supplied by the synchronous machine is such that the voltage steps applied during battery charging will always result in charging of the appropriate stage or stages of the battery. The charging and discharging of capacitors 130 and 160 in the battery charge circuit and battery discharge circuit, respectively, follows the sequence previously discussed. Also, as described in connection with the operation of the circuit of FIGURE 6, the current flow during the charge mode is always in a direction to charge the battery. In other words, during this mode of operation the static inverter converts the applied A.C. voltage to a D.C. voltage and thereby charges the battery, insuring that the full voltage of the several battery stages will be available when staircase waveform generating (battery discharge mode) by the inverter is required.

When clutch 97 is disengaged, the prime mover 95 is removed and all the power to the load is supplied by the battery. The pulse generating, current sensing, and logic circuits of the static inverter govern the operation of the battery charge and charge SCR's in the manner indicated above and in conjunction with the description of the circuitry of FIGURES 6 and 3. The effect of the discharge mode operation is, of course, an inversion of the D.C. voltage supplied by the battery to an A.C. voltage having a staircase waveform.

It should be emphasized that current may or may not flow immediately in main rectifying SCR pairs 154 and 155 or pair 156 and 157 when that pair is switched on. If only minute currents are flowing alternately to charge and discharge the battery, current may not flow for several steps of the staircase voltage when flip-flop 218 switches from one state to the other. However, the flip-flop remains stable after being switched until current does flow, and when current returns to zero, circuit 230 will provide an output pulse to change the state of flip-flop 218. Flip-flop 213 on the other hand is switched every 1/120 of a second, or twice each cycle of 60 c.p.s. voltage.

It should also be emphasized that, in either the charge mode or the discharge mode, the static converter may be required to operate at other than unity power factor. This means, in effect, that circuits 213 and 218 do not switch simultaneously and that the mode of operation momentarily reverts, at the end or beginning of each half cycle of 60 c.p.s. voltage depending upon whether the power factor is leading or lagging, to the opposite mode of operation. The results of this operation may be summarized as follows:

(1) When the 60 c.p.s. voltage passes through zero, and current through the static inverter continues to flow or remains at zero, the static inverter will switch from either the charge mode to the discharge mode or from the discharge mode to the charge mode;

(2) When current ceases to flow through the static inverter (i.e. SCR's 154 and 155 or 156 and 157 are conducting and revert to the blocking state when current goes to zero) and the 60 c.p.s. fundamental voltage is not at that moment passing through zero, the static inverter will switch from either the charge mode to the discharge mode or from the discharge mode to the charge mode;

(3) Should the 60 c.p.s. voltage pass through zero at the same time that current through the static inverter goes to zero (i.e. unity power factor) the static inverter will not change mode;

(4) The current through the static converter may take any direction, waveform, or magnitude commensurate with the circuit component ratings, and frequency of reversal from D.C. to 1.5 kc./s. and all necessary switching to provide charging or discharging of the battery will automatically be performed by the circuit logic; while (5) The voltage at the load will be maintained sinusoidal at 60 c.p.s. with an RMS value dependent upon the terminal voltage of the battery plus (for charge) and minus (for discharge) the $I_{RMS}R$ dropped across the circuit components.

A suitable circuit for use as current sensing circuit and pulser generator 230 for the purpose of sensing the cessation of current through the inverter and pulsing the bistable multivibrator 218 of FIGURE 8 into the proper state, is shown in FIGURE 9. Transformer 300, which may be adapted to saturate at approximately 5 milliamperes, carries the inverter current. Most SCR's of the conventional type will revert to the blocking state prior to forward current falling below 5 mililamperes, and since there is always at least one SCR carrying the inverter current and having an associated gate which is not held positive but is only pulsed, the inverter current will abruptly drop to zero once it has fallen to approximately 6 to 8 ma. This sudden drop in inverter current produces a pulse in the secondary winding of transformer 300 when the flux unsaturates and falls to zero. Polarity of this pulse depends upon the direction of current flow, i.e. from A to B or from B to A (hereinafter referred to as $I_{AB}$ and $I_{BA}$, respectively).

With a positive pulse applied to the base electrode of transistor 307 an amplified positive pulse is produced as output $E_{01}$, while a positive pulse at the base electrode of transistor 308 will result in amplified positive pulse as output $E_{02}$. If the proper polarity is observed, these pulses may be utilized to switch the state of multivibrator 218 (FIGURE 8) so that if current has just ceased in the A–B direction, the multivibrator will only allow current to flow again in the B–A direction. When current does begin to flow in the B–A direction (i.e. current $I_{BA}$), transformer 300 again saturates and a current pulse is produced in the secondary winding with the same polarity as when the current ceased in the A–B direction. Hence, multivibrator 218 is again pulsed, but no change of state of the multivibrator is thereby produced because only pulses of alternate polarity will switch the state of the multivibrator. When current ceases in the B–A direction, multivibrator 218 receives an opposite polarity pulse from circuit 230 and accordingly switches state. Thus, whenever current ceases in one direction, e.g. A–B, the flip-flop is switched and current can flow again only in the opposite direction. Current in the opposite direction, e.g. B–A, can continue until it again falls to zero after which current flow can occur only in the A–B direction.

Current sensing circuits 235 and 237 in the battery charge and discharge circuits, respectively, may be implemented in a manner similar to that of sensing circuit 230, except that the former circuits need respond only to the presence and absence of current flow. For example, current flow through the transformer produces transformer core saturation resulting in a generation of a pulse to gate off the associated AND gates, while the cessation of current flow will result in unsaturation of the core and production of a pulse of opposite polarity to turn on the respectively associated AND gates.

While the solid state static inverter of FIGURE 8 can accommodate current of any waveform, whether synchronous or non-synchronous with a leading or lagging power factor, if the load is reactive it may be desirable to correct the load reactive current with the synchronous machine. The machine will have an inductive effect if the field is underexcited and a capacitive effect if the field is overexcited. Under conditions in which the load is resistive and the field strength is such that the synchronous machine output voltage equals the inverter output voltage, the converter will have a sinusoidal current waveform at unity power factor, in phase with the voltage for discharging the battery and 180 degrees out of phase for charging the battery. However, if the load is not resistive, but is instead capacitive or inductive, the inverter will have a leading or lagging power factor for a synchronous machine voltage equal to the inverter voltage. When such a reactive load exists, the load power factor may be compensated, although this is not essential, by overexciting for a load with a lagging power factor or by underexciting the field winding for a load with a leading power factor. In this manner, the static inverter "looks into" a pure resistive load and unity power factor. A circuit which will produce this automatic compensation for both charging and discharging is shown in FIGURE 10.

Referring now to FIGURE 10, the circuit comprises a symmetrical 120 c.p.s. multivibrator 320, to which the output of AND gate 212 (FIGURE 8) is applied; a phase discriminator to which the outputs of multivibrators 320, 213 and 218 are applied; a buffer stage 322 responsive to the output of phase discriminator 321; an unsymmetrical multivibrator 323, to which the output of AND gate 212 and buffer stage 322 are applied; and a variable duty cycle D.C. power supply 324 arranged to receive the output of multivibrator 323 and to apply excitation to the field winding of the synchronous machine in a manner to overexcite or to underexcite the field, as required.

Multivibrator 320 is phase locked to the system by synchronizing pulses from AND gate 212 and produces an output $E_1$ which is alternately positive and negative 120 times per second as an input to an emitter follower 350. The latter transistor may be turned on or off, i.e. rendered conductive or non-conductive, according to the state of transistor switch 351. The RC time constant provided by resistor 353 and capacitor 354 is selected to be approximately ten times $\frac{1}{120}$ second so that the voltage $E_2$ on capacitor 354 will be the time integral of the output of transistor 350 during that portion of time in which transistor 350 is turned on. When transistor 350 is turned off by transistor 351, its output is no longer integrated and the voltage $E_2$ on capacitor 354 is held constant. It will be observed from a consideration of FIGURE 10 that transistor 350 is turned on by transistor 351 only when the input voltages applied to transistors 356 and 357, from flip-flops 213 and 218, respectively, are both negative; and that when either or both of the inputs to transistors 356 and 357 are positive, transistor 351 turns off transistor 350.

Figure 11:
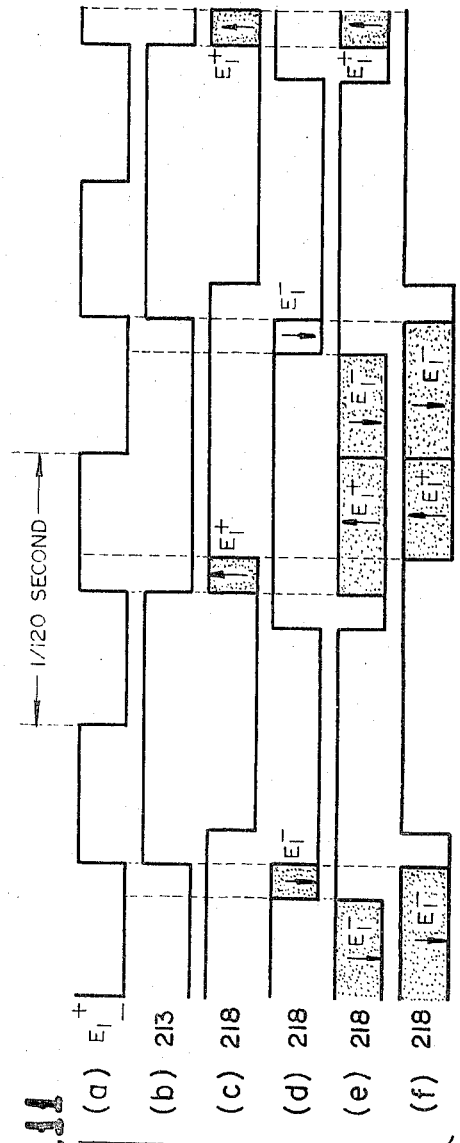

A better understanding of the operation of the circuit of FIGURE 10 will be gained by concurrent reference to FIGURES 11(a) through 11(f). FIGURES 11(a), 11(b) and 11(c) illustrate respectively the output of multivibrators 320, 213 and 218. Output voltage $E_1$ of multivibrator 320 is phase locked to the output of flip-flop 213 by the timing pulses arriving from AND gate 212. With the battery supplying power to an inductive load, the output of flip-flop 218 is as shown in FIGURE 11(c). In such a case, the inverter current lags the voltage. The shaded area of FIGURE 11(c) illustrates the time interval during which both transistor 356 and 357 have negative inputs, so that transistor 351 turns on emitter follower 350 during the condition of lagging current while the batteries are discharging. The arrow in the shaded area of FIGURE 11(c) indicates that during this time interval the output of transistor 350 is positive, and the charge $E_2$ on capacitors 354 is increasing. Under these conditions, the output of emitter follower 360 of buffer stage 322 is increased when that transistor is turned on. The turning on of emitter follower 360 is in turn accomplished when transistor 365 of multivibrator 323 is turned off. During the interval in which transistor 360 is turned on, the voltage on capacitor 367 rises more rapidly to fire transistor 370 in a shorter time interval, because voltage $E_2$ has increased. Firing transistor 370 in a shorter interval of time switches the state of flip-flop 323 to turn off transistor 372 and turn on transistor 365 which increases the duty cycle of transistor 365. Transistor 360 of buffer stage 322 is thereby rendered non-conductive and will remain so until a timing pulse from AND gate 212 switches the state of multivibrator 323, at which time the cycle is repeated.

Variable duty cycle power supply 324 is turned on and off in accordance with the turning on and off, respectively, of transistor 365, providing an output which increases as the duty cycle increases and which supplies the excitation for the field winding 377 of synchronous machine 90. When the field increases (i.e., is overexcited) the synchronous machine becomes capacitive in effect and corrects for the lagging current of the load. A unity power factor is thereby achieved and transistor 350 of phase discriminator 321 is maintained in the non-conductive state so that voltage $E_2$ (on capacitor 354) remains stable.

Referring to FIGURE 11(d), if the load current begins to lead the voltage, as shown, because of a leading power factor, transistor 350 is rendered conductive when voltage $E_1$ is of negative polarity. The time interval during which the transistor is on is indicated by the shaded portion of FIGURE 11(d), and the downwardly pointing arrow indicates that the output of the phase discriminator and, therefore, the voltage $E_2$ will integrate downwardly. It will readily be observed that, under these conditions, a longer time interval is required to charge capacitor 367 to a voltage which will fire transistor 370. Hence, the switching rate of unsymmetrical multivibrator 323 is such as to decrease the duty cycle of power supply 324, so that the synchronous machine field decreases (i.e., becomes underexcited, and synchronous machine 90 acts as an inductance) to correct for the leading power factor.

FIGURE 11(e) represents the voltage applied to transistor 357 from flip-flop 218 during the time that battery 100 (FIGURE 8) is being charged. The shaded areas are indicative of the time intervals during which transistor 350 is conductive, and the direction of the arrowheads in those shaded areas represents the direction in which the voltage $E_2$ on capacitor 354 is proceeding. When the charging current is leading the voltage, the net integrated $E_2$ will be increasing and, as previously discussed, field strength will increase so that synchronous machine 90 appears more capacitive. The overall effect is the same as though the static inverter were going inductive, to correct for the leading current to the inverter during charging of the battery.

FIGURE 11(f) represents the voltage applied from flip-flop 218 to transistor 357 when the charging current for the battery is lagging the voltage. In such a case, the integrated charge $E_2$ on capacitor 354 is decreasing, field strength is decreasing, and synchronous machine 90 becomes more inductive. The static inverter thus appears more capacitive to correct for the lagging charging current.

In this manner, lagging or leading power factor, during the condition of either charging or discharging of the battery, is compensated for in a simple and reliable fashion.

While I have disclosed a preferred embodiment of my invention, it will be apparent to those skilled in the art to which the invention pertains that variations in the specific details of construction which have been illustrated and described may be resorted to without departing from the spirit and scope of the invention as defined in the appended claims.

What I claim is:

1. A static inverter for selectively and alternately charging a plurality of series-connected batteries from an A.C. power source and discharging said batteries to supply A.C. power to a load, said inverter comprising:
    a first plurality of normally non-conductive unidirectional current switches,
    means coupling each of said switches to said batteries and to said power source to connect a distinct and different group of said series-connected batteries across the output terminals of said power source via each switch, when rendered conductive,
    means for selectively and sequentially rendering each of said switches conductive as the output voltage of said power source reaches a magnitude exceeding the voltage of the group of series-connected batteries respectively associated therewith, for application of D.C. charging current to that group of batteries,
    a further plurality of normally non-conductive unidirectional current switches,
    means coupling each of said further plurality of switches to said batteries and to said load to connect a distinct and different group of said series-connected batteries across said load via each switch, when rendered conductive,
    further means for selectively and sequentially rendering each of said further plurality of switches conductive to apply the output voltages from said groups of batteries to said load in the form of a staircase A.C. voltage, and
    charge and discharge mode selection means for selectively activating the first-named and further switch rendering means according to whether charging or discharging of said batteries, respectively, is dictated, in response to timing and current conditions in said inverter.

2. The combination according to claim 1 wherein the first-mentioned and further coupling means are interconnected so that said A.C. power source, when energized, supplies power to both said batteries and said load, and when said A.C. power source is de-energized, the power to said load is furnished solely by said batteries.

3. The combination according to claim 2 wherein said interconnected coupling means includes means for maintaining the alternating current flow from said A.C. power source to said batteries in a single direction to charge the batteries, and for reversing the polarity of current from said batteries to said load in an A.C. waveform.

4. The combination according to claim 3 wherein said means for maintaining and reversing comprises a third plurality of normally non-conductive current switches connected in the form of a rectifying bridge,
    said A.C. power source and said load connected in parallel circuit across one diagonal of said bridge, and
    the combination of said first and further plurality of switches and said plurality of batteries connected across the other diagonal of said bridge.

5. The combination according to claim 4 wherein said mode selected means includes means for synchronizing the selection of said switches to be rendered conductive, with the output frequency of said A.C. power source and the A.C. frequency required by said load.

6. The combination according to claim 5 wherein said synchronizing means includes a pulse generator having a pulse repetition frequency equal to an integral multiple of said output frequency of said A.C. power source and said A.C. frequency required by said load, and
    wherein said mode selection means further includes sensing means in series with the parallel circuit of said power source and said load across said one diagonal of said bridge and responsive to current reversals therethrough to effect charging or discharging of said batteries in accordance with said current reversals.

7. The combination according to claim 6 wherein said single synchronizing means further includes
    a ring counter having a plurality of stages responsive to pulses from said generator for cyclically and sequentially supplying output pulses from said stages thereof, and
    wherein said charge and discharge mode selection means further comprises means for generating output pulses to control the charging and discharging of said batteries in response to the simultaneous presence or absence of current in the load and the receipt of pulses from said generator;
    and wherein the first-mentioned means and further means for selectively and sequentially rendering said switches conductive each include
        a plurality of AND gates, each associated with a distinct and different one of the respective first and further plurality of switches, and each responsive to the coincident application thereto of a pulse from said charge and discharge control means and a pulse from a respectively associated ring counter stage, for triggering the associated one of said switches to a conductive state.

8. The combination according to claim 1 wherein each of the switches is a silicon controlled rectifier.

9. The combination according to claim 7 further including means responsive to output pulses from said pulse generator and from said charge and discharge control means for correcting variations from unity power factor during intervals of charging and discharging of said batteries.

10. A static electrical conversion system for supplying A.C. power to a load from a plurality of D.C. energy storage cells and for replenishing from an A.C. power source the energy of said storage cells depleted during supply of power to said load, said system comprising
    first switch means effective, when energized, to selectively connect distinct and different groups of said cells to said load in a predetermined sequence to provide energy to said load in the form of an A.C. staircase waveform,
    second switch means effective, when energized, to selectively connect distinct and different groups of said cells to said A.C. power source in a sequence governed by the magnitude of the energy delivered by said source and the respective magnitudes of the output energy of the last-named groups of cells, and means for selectively energizing said first switch means and said second switch means at respectively different times to power said load from said plurality of cells and to supply power to said cells from said source in synchronism with the A.C. frequency of said source and in response to predetermined variations in the delivery of energy to said load.

11. The invention according to claim 10 wherein said switch energizing means includes means for sensing current flow through said load and means for timing the energization of said first switch means in accordance with said A.C. frequency.

References Cited

UNITED STATES PATENTS

| | | | |
|---|---|---|---|
| 1,362,794 | 12/1920 | Hoffman | 320—17 |
| 2,920,217 | 1/1960 | House | 320—15 X |
| 3,100,851 | 8/1963 | Ross et al. | 307—107 |
| 3,237,078 | 2/1966 | Mallory | 320—17 |
| 3,293,445 | 12/1966 | Levy | 321—45 X |
| 3,305,754 | 2/1967 | Oaks et al. | 320—37 |
| 3,339,080 | 8/1967 | Howald | 321—45 X |

FOREIGN PATENTS 834,022 5/1960 Great Britain.

JOHN F. COUCH, *Primary Examiner.*

STANLEY WEINBERG, *Assistant Examiner.*

U.S. Cl. X.R.

307—66, 107; 320—17; 321—5, 45